(12) United States Patent
Kogawa (10) Patent No.: US 7,195,174 B2
(45) Date of Patent: Mar. 27, 2007

(54) MOBILE COMMUNICATION TERMINAL INCLUDING NON-CONTACT IC CARD AND METHOD OF TRANSFERRING TRANSACTION INFORMATION

(75) Inventor: Ryutaro Kogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/815,729

(22) Filed: Apr. 2, 2004

(65) Prior Publication Data

US 2004/0195325 A1 Oct. 7, 2004

(30) Foreign Application Priority Data

Apr. 3, 2003 (JP) ............................. 2003-100062

(51) Int. Cl.
*G06K 19/06* (2006.01)
*G06K 7/08* (2006.01)

(52) U.S. Cl. ...................................... 235/492; 235/451

(58) Field of Classification Search ........ 235/380–382, 235/451, 492, 379, 486, 439; 705/41, 44, 705/64–65, 67
See application file for complete search history.

(56) References Cited

U.S. PATENT DOCUMENTS

| | | | | |
|---|---|---|---|---|
| 4,634,845 A | * | 1/1987 | Hale et al. ................. | 235/380 |
| 5,530,438 A | | 6/1996 | Bickham et al. | |
| 5,991,749 A | * | 11/1999 | Morrill, Jr. .................. | 705/44 |
| 6,142,369 A | * | 11/2000 | Jonstromer ................. | 235/380 |
| 6,978,940 B2 | * | 12/2005 | Luu ........................... | 235/486 |
| 2002/0060246 A1 | | 5/2002 | Gobburu et al. | |
| 2002/0123965 A1 | * | 9/2002 | Phillips ....................... | 705/41 |
| 2002/0152178 A1 | * | 10/2002 | Lee ............................. | 705/67 |
| 2003/0085288 A1 | * | 5/2003 | Luu ........................... | 235/492 |
| 2003/0174839 A1 | * | 9/2003 | Yamagata et al. ......... | 380/270 |
| 2004/0050932 A1 | * | 3/2004 | Fukada et al. ............. | 235/380 |
| 2004/0065734 A1 | * | 4/2004 | Piikivi ......................... | 235/451 |

FOREIGN PATENT DOCUMENTS

| | | | |
|---|---|---|---|
| EP | 1030272 A2 | * | 8/2000 |
| FR | 2801995 A1 | | 6/2001 |
| GB | 2378294 A | | 2/2003 |
| JP | 2001-346259 A | | 12/2001 |
| JP | 2002-91883 A | | 3/2002 |
| JP | 2002-230492 A | | 8/2002 |
| JP | 2002-271508 A | | 9/2002 |
| JP | 2002-342362 A | | 11/2002 |
| JP | 2003-23666 A | | 1/2003 |
| WO | WO 0186538 A1 | | 11/2001 |
| WO | WO 0198970 A1 | | 12/2001 |

* cited by examiner

*Primary Examiner*—Thien M. Le
*Assistant Examiner*—April Taylor
(74) *Attorney, Agent, or Firm*—Sughrue Mion, PLLC

(57) ABSTRACT

A mobile communication terminal in accordance with the present invention includes a non-contact IC card into which an external IC-card reader/writer can write transaction information. The mobile communication terminal, when transaction information is written into the non-contact IC card, transforms the transaction information into an electric mail, and transmits the electric mail to a predetermined address.

18 Claims, 5 Drawing Sheets

| TRANSACTION INFORMATION | |
|---|---|
| DATE/TIME | 13:00 Jan.1, 2004 |
| PLACE | XXX DEPARTMENT STORE |
| PURPOSE | PURCHASE |
| OBJECT | CLOTH |
| SUM | ¥10500 |

FIG.1C
PRIOR ART

| TRANSACTION INFORMATION | |
|---|---|
| DATE/TIME | 14:00 Jan.14, 2004 |
| PLACE | YYY STATION |
| PURPOSE | FARE |
| SUM | ¥160 |

MOBILE COMMUNICATION TERMINAL INCLUDING NON-CONTACT IC CARD AND METHOD OF TRANSFERRING TRANSACTION INFORMATION

BACKGROUND OF THE INVENTION

1. Field of the Invention

The invention relates to a mobile communication terminal having a non-contact IC card.

2. Description of the Related Art

An electronic account-settlement system including a non-contact IC card is presently practically used, for instance, in a ticket-examination system in various transportation systems. In addition, an electronic account-settlement system is also being developed as a pre-paid type electronic money system for shopping, for instance.

A present non-contact IC card is not designed to have a function of displaying data stored therein. Hence, a history of how a non-contact IC card is used is displayed through an IC-card reader/writer as a viewer such as a ticket-examination unit.

In order to make it unnecessary to use an IC-card reader/writer as a viewer for viewer a history of how a non-contact IC card is used, there has bee suggested a mobile communication terminal such as a cellular phone including a non-contact IC card. A history of how a non-contact IC card is used is stored in a memory and displayed through a display unit in a mobile communication terminal. That is, a mobile communication terminal acts as a viewer for viewing information stored in a non-contact IC card.

Figure 1A:
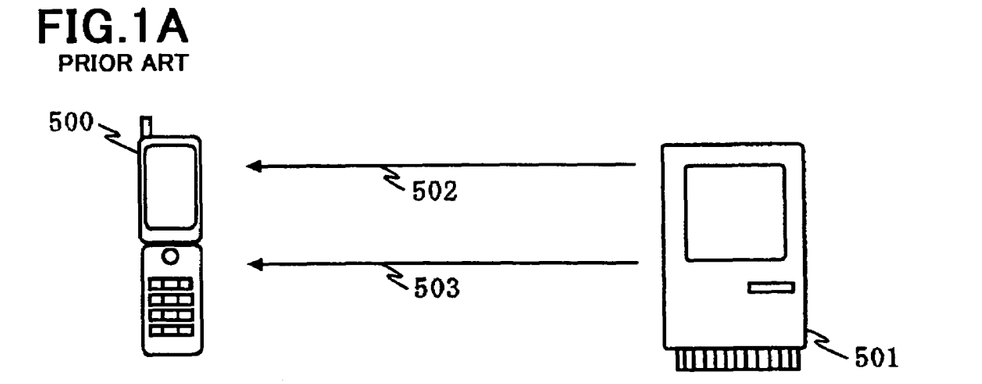
FIG. 1A illustrates an example of a conventional cellular phone as a mobile communication terminal, including a non-contact IC card therein.

FIG. 1A illustrates an example of a conventional cellular phone 500 as a mobile communication terminal, including a non-contact IC card therein.

The cellular phone 500 makes electronic settlement with an IC-card reader/writer 501. When a user of the cellular phone 500 purchases something through electronic money, a user receives a charge 502 to be paid from the IC-card reader/writer 501 through his/her cellular phone 500, and further receives transaction information 503, for instance, including a name of a shop, an address of a shop, a telephone number of a shop, date and time of purchase, what a user purchased, and so on. The received transaction information 503 is stored in a memory in the cellular phone 500.

Figure 1B:
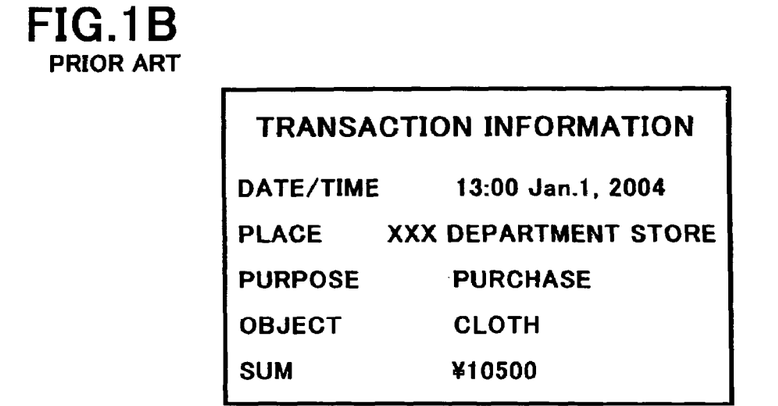
FIG. 1B illustrates an example of transaction information.

FIG. 1B illustrates an example of the transaction information 503. The illustrated transaction information 503 shows that a user purchased a cloth at XXX department store at a price of ¥10,500 on 13:00, Jan. 1, 2004.

Figure 1C:
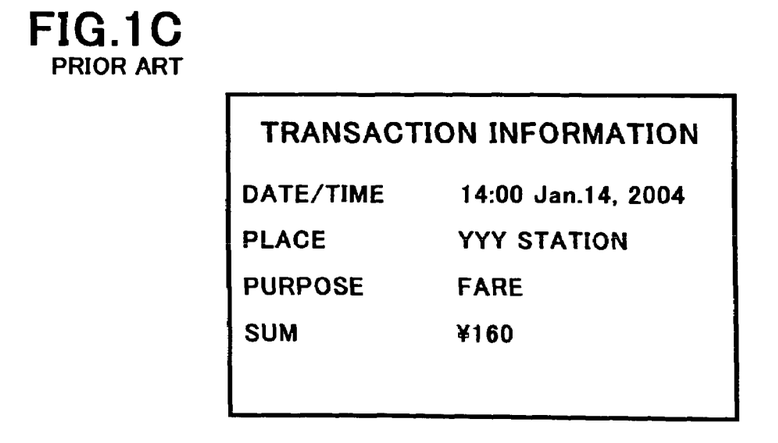
FIG. 1C illustrates another example of transaction information.

FIG. 1C illustrates another example of the transaction information 503. The illustrated transaction information 503 shows that a user paid ¥160 as fare at YYY station on 14:00, Jan. 14, 2004.

Figure 2:
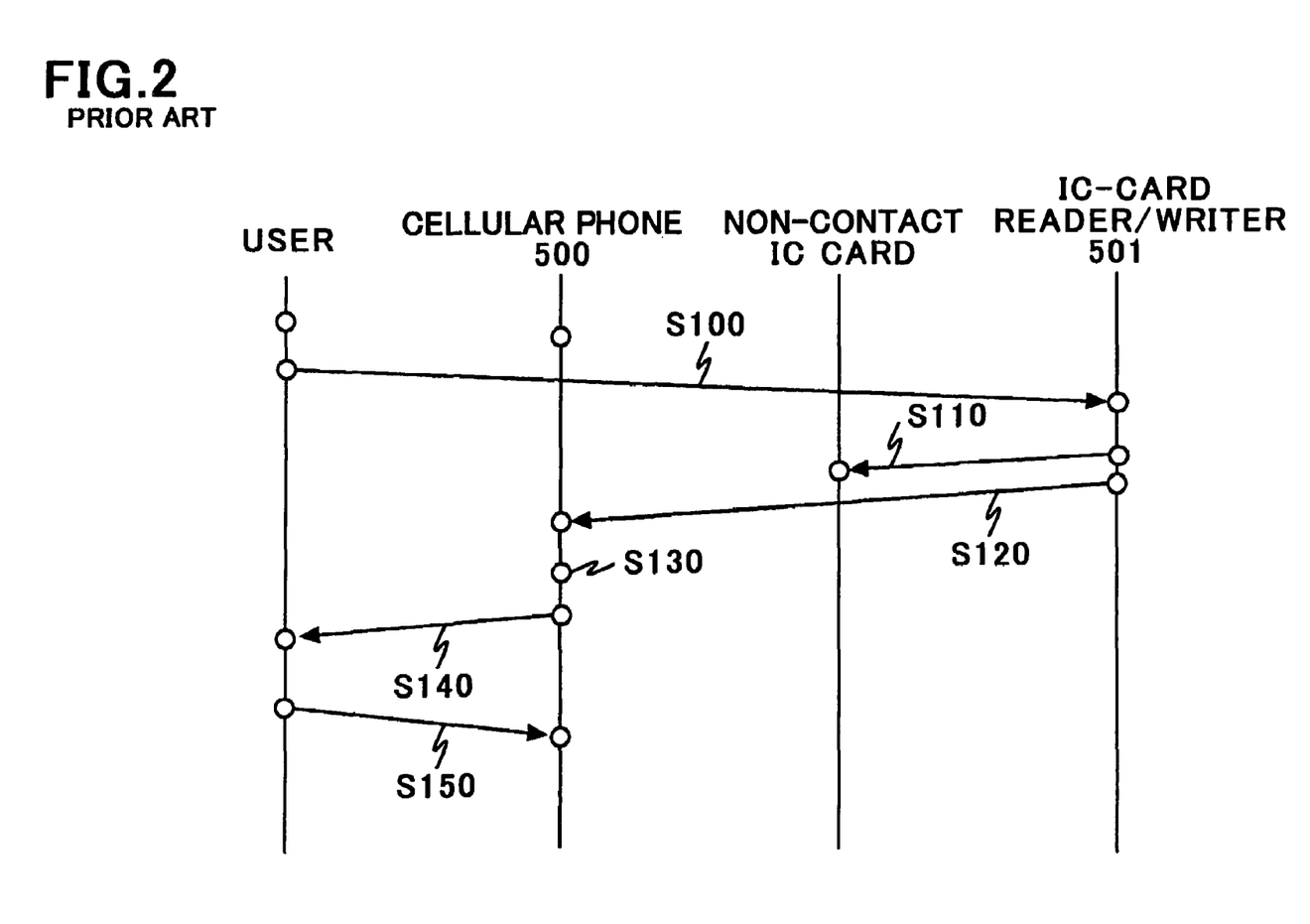
FIG. 2 is a flow-chart showing steps to be carried out when a user purchases something through electronic money through his/her conventional cellular phone.

FIG. 2 is a flow-chart showing steps to be carried out when a user purchases something through electronic money through his/her cellular phone 500.

When a user of the cellular phone 500 purchases something through electronic money, the IC-card reader/writer 501 reads data out of a non-contact IC card for identifying the user (step S100).

The IC-card reader/writer 501 charges the non-contact IC card of a fee 502 (step S110), and concurrently, transmits the transaction information 503 to the cellular phone 500 (step S120).

On receipt of the transaction information, the cellular phone 500 stores the received transaction information in a memory (step S130). If requested by the user, the cellular phone 500 displays all of the transaction information 503 stored in a memory (step S140). Then, the user can view the transaction information 503 displayed in a display screen of his/her cellular phone 500 (step S150).

A memory of the cellular phone 500 is used also for storing a telephone directory, e-mails and various data. Hence, just a small memory capacity is assigned to storage of a history of how a non-contact IC card has been used.

Thus, when much history is stored in a memory, older history is deleted when newer history is stored into a memory. For instance, if a user uses a non-contact IC card as a ticket or a wallet, such history renewal is frequently carried out, resulting in that old history of how the non-contact IC card has been used is renewed at a high pace. Hence, it is preferable for a user that a memory of the cellular phone 500 has a big capacity.

In addition, a history of how a non-contact IC card has been used is stored only in a memory of the cellular phone 500, if a user lost his/her cellular phone 500 or the cellular phone 500 were out of order, such a history is lost, unless a user copies the history in another memory as back-up data.

Furthermore, if a user lost his/her cellular phone 500, he/she cannot find the cellular phone 500, unless the cellular phone 500 has a GPS (Global Positioning System) function. In particular, if a lost cellular phone includes a non-contact IC card therein, the non-contact IC card may be illegally used.

Japanese Patent Application Publication No. 2001-346259 has suggested a communication system including a mobile communication terminal, and a mobile communication network, where the mobile communication terminal receives image or character data stored in the mobile communication network. The image or character data is transferred to another mobile communication terminal through another mobile communication network.

Japanese Patent Application Publication No. 2002-271508 has suggested a system for administrating private data, where private data stored in a cellular phone is stored in a database in a data-center and administrated by the data-center. When the data is revised or the data is updated, a notification mail is transmitted to a user.

Japanese Patent Application Publication No. 2002-91883 has suggested a cellular phone which downloads content data and a content file including content information relating to the content data, from a server, and stores them in a memory card. The cellular phone reads the content information out of the memory card, and makes a content mail to which the content information is attached. The content mail is transmitted from the cellular phone to another cellular phone.

Japanese Patent Application Publication No. 2002-230492 has suggested a memory card storing various data therein, including an optical media and a non-contact IC chip.

Japanese Patent Application Publication No. 2002-342362 has suggested a data communication system in which when a mobile memory medium has been used, a data administrator transmits credit card information and/or card-user information to a cellular phone of a user.

Japanese Patent Application Publication No. 2002-23666 has suggested a data communication system including a mobile terminal having destination data indicative of a destination to which an e-mail is to be transmitted, a data reader which transmits the destination data read out of the mobile terminal together with ID data for identifying the data reader, and a server which transmits data indicative of a location at which the data reader is placed, to the destination indicated by the destination data.

SUMMARY OF THE INVENTION

In view of the above-mentioned problems in the conventional mobile communication terminal, it is an object of the present invention to provide a mobile communication terminal which is capable of storing transaction information in a small-capacity memory, preventing a non-contact IC card from being illegally used by others, and making it possible for a user to detect a present location of his/her mobile communication terminal, even if he/she lost his/her mobile communication terminal.

It is also an object of the present invention to provide a method of transferring transaction information in a mobile communication terminal including a non-contact IC card into which an external IC-card reader/writer can write transaction information, which method is capable of doing the same as the above-mentioned mobile communication terminal.

It is further an object of the present invention to provide a program for causing a computer to carry out the above-mentioned method.

Hereinbelow, a mobile communication terminal, a method and a program in accordance with the present invention are described through the use of reference numerals used in later described embodiments. The reference numerals are indicated only for the purpose of clearly showing correspondence between claims and the embodiments. It should be noted that the reference numerals are not allowed to use in the interpretation of claims of the present application.

In one aspect of the present invention, there is provided a mobile communication terminal (100) including a non-contact IC card (101) into which an external IC-card reader/writer (200) can write transaction information (210), wherein the mobile communication terminal (100), when transaction information (210) is written into the non-contact IC card (101), transforms the transaction information (210) into an electric mail (211), and transmits the electric mail (211) to a predetermined address (122).

It is preferable that the predetermined address (122) is varied by a user by inputting a new address into the mobile communication terminal (100), in which case, it is preferable that the predetermined address (122) is allowed to be varied after the user is authenticated.

For instance, authentication is carried out when a password which the user inputs to the mobile communication terminal (100) is identical with a predetermined password.

For instance, the mobile communication terminal is comprised of a cellular phone (100).

In another aspect of the present invention, there is provided a method of transferring transaction information (210) in a mobile communication terminal (100) including a non-contact IC card (101) into which an external IC-card reader/writer (200) can write transaction information, including (a) when transaction information (210) is written into the non-contact IC card (101), transforming the transaction information (210) into an electric mail (211), and (b) transmitting the electric mail (211) to a predetermined address (122).

The method may further include the step of varying the predetermined address (122) by inputting a new address into the mobile communication terminal (100).

The method may further include the step of making authentication as to whether a person who input the new address is really a user of the mobile communication terminal (100), before the predetermined address (122) is varied.

In still another aspect of the present invention, there is provided a program for causing a computer to carry out a method of transferring transaction information (210) in a mobile communication terminal (100) including a non-contact IC card (101) into which an external IC-card reader/writer (200) can write transaction information (210), steps executed by the computer in accordance with the program including (a) when transaction information (210) is written into the non-contact IC card (101), transforming the transaction information (210) into an electric mail (211), and (b) transmitting the electric mail (211) to a predetermined address (122).

The steps may further include varying the predetermined address (122) when a user of the mobile communication terminal (100) inputs a new address into the mobile communication terminal (100).

The steps may further include making authentication as to whether a person who input the new address is really a user of the mobile communication terminal (100), before the predetermined address (122) is varied.

The advantages obtained by the aforementioned present invention will be described hereinbelow.

Since a history of how a non-contact IC card has been used is stored in a limited storage area in a memory, older data is deleted when newer data is stored. However, if old data indicative of a history of how a non-contact IC card has been used is transferred to a second mobile communication terminal, a memory of the second mobile communication terminal can be used as an external memory of the first mobile communication terminal. Accordingly, a non-contact IC card of a mobile communication terminal may be designed to have a small capacity.

Considering that transfer of a history of how a non-contact IC card in a first mobile communication terminal has been used to a memory in a second mobile communication terminal is equivalent to back-up of the history in a memory in a second mobile communication terminal, the history is automatically copied in a memory of another mobile communication terminal without acknowledgment of a user. Hence, even if a user lost his/her mobile communication terminal or his/her mobile communication terminal became out of order, a user can keep back-up data indicative of a history of how a non-contact IC card in his/her mobile communication terminal has been used.

An address to which an e-mail is to be transmitted from a mobile communication terminal can be varied, only when a person who tries to change an address is judged to be really a user of the mobile communication terminal. That is, authentication may be made as to whether a person who tries to change an address is really a user of the mobile communication terminal, before an address is changed. Even if the mobile communication terminal is lost or thieved, and a non-contact IC card in the mobile communication terminal is illegally used, transaction information is transmitted to an address which a user has determined. Hence, such transaction information can be used for identifying a place in which a non-contact IC card has been used. In addition, a user may be compensated for by an insurance company, based on the transaction information.

Furthermore, when a non-contact IC card is used, an e-mail indicative of transaction information is concurrently transmitted to a predetermined address. Since the transaction information includes data indicative of a place at which a non-contact IC card has been used, it would be possible to detect a place at which a non-contact IC card has been used, without use of GPS.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 3:
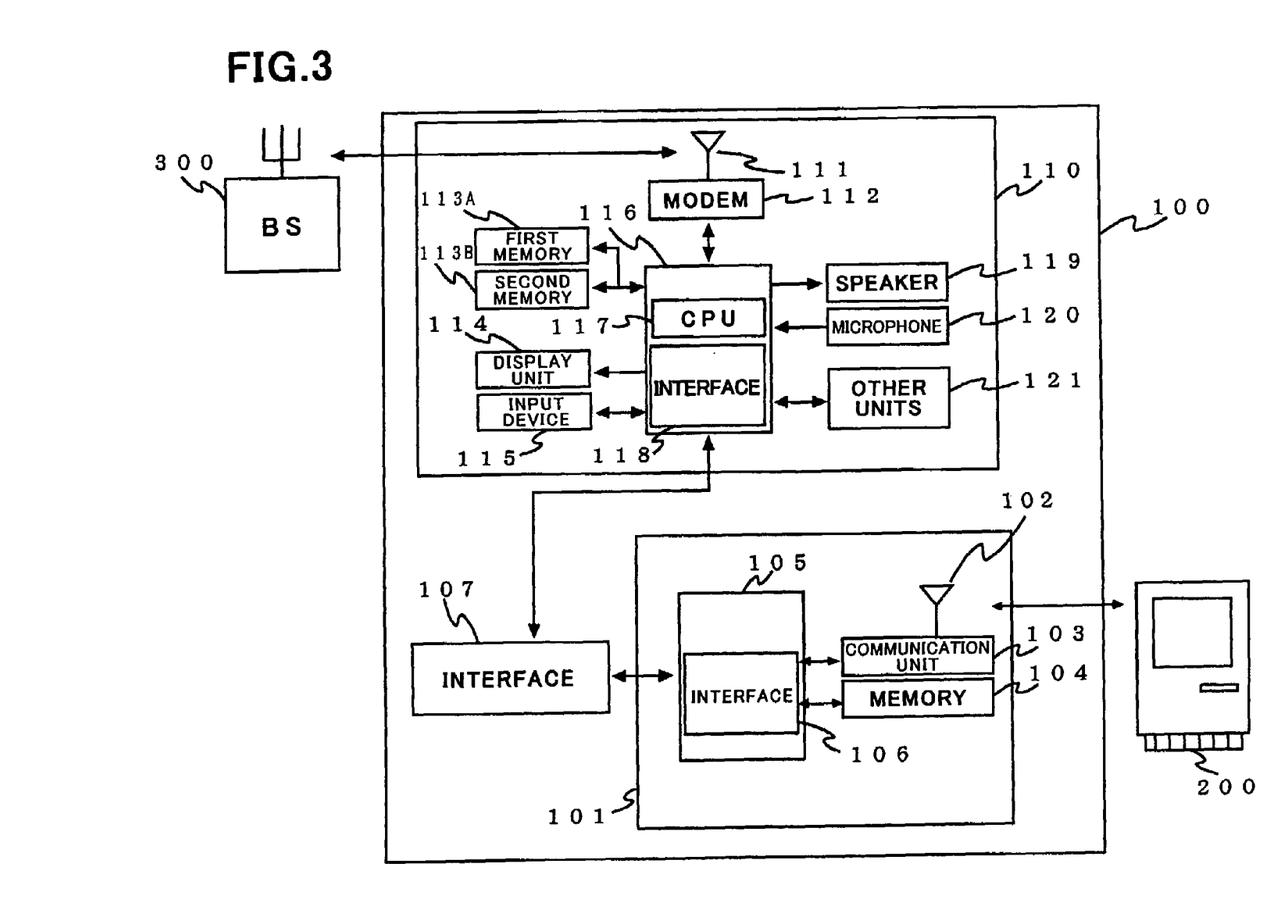
FIG. 3 is a block diagram of a mobile communication terminal in accordance with a preferred embodiment of the present invention.

FIG. 3 is a block diagram of a mobile communication terminal in accordance with a preferred embodiment of the present invention.

A mobile communication terminal in accordance with the embodiment is constructed as a cellular phone 100.

The cellular phone 100 is comprised of a non-contact IC card 101, a phone unit 110, and an interface 107 through which the non-contact IC card 101 and the phone unit 110 can make communication with each other. The phone unit 110 can make communication with a public network such as a cellular phone network or Internet through a base station 300. An external IC-card reader/writer 200 writes data into the non-contact IC card 101, and reads data out of the non-contact IC card 101. As mentioned later, the non-contact IC card 101 receives transaction information from the external IC-card reader/writer 200, and transmits the received transaction information to the phone unit 110 through the interface 107.

Though the cellular phone 100 is designed to fixedly include the non-contact IC card 101, the non-contact IC card 101 may be designed to be able to be inserted into and pulled out of the non-contact IC card 101.

The non-contact IC card 101 is comprised of an antenna 102, a communication unit 103 which makes communication with the external IC-card reader/writer 200 through the antenna 102, a memory 104, and a controller 105 which controls operation of the communication unit 103 and the memory 104.

The controller 105 has a function of making electronic settlement in electric money, and includes an interface 106 through which transaction information relating to electronic settlement made by the controller 105 is transmitted to the phone unit 110. Herein, the transaction information includes date and time at which a user purchased something, an address of a shop at which a user purchased something, what was purchased by a user, and a charge for what a user purchased, and so on.

The phone unit 110 is comprised of an antenna 111, a modem (modulator/demodulator) 112 through which a signal to be transmitted is modulated and a signal received through the antenna 111 is demodulated, a controller 116 controlling other parts in accordance with a control program, a first memory 113A, a second memory 113B, a display unit 114 comprised of a liquid crystal display device, and displaying data input by a user and data received from other terminals, an input device 115 comprised of a plurality of keys through which a user can input data into the controller 116, a speaker 119 through which voice signals are output to a user, a microphone 120 through which a user inputs voice signals into the controller 116, and other units 121 such as a vibrator and a light-emitting diode (LED).

The phone unit 110 acts as a conventional cellular phone without a non-contact IC card.

The controller 116 is comprised of a central processing unit (CPU) 117 and an interface 118. The central processing unit 117 controls operation of the modem 112, the first and second memories 113A and 113B, the display unit 114, the input device 115, the speaker 119, the microphone 120, and the other units 121. As mentioned later, the central processing unit 117 receives transaction information from the non-contact IC card 101 through the interfaces 107 and 118, and transforms the thus received transaction information into an e-mail.

Each of the first and second memories 113A and 113B is comprised of a semiconductor memory such as a read-only memory (ROM), a random access memory (RAM) or an IC memory card, a flexible disk, a hard disc, an optic magnetic disc or other storage devices.

The first memory 113A stores therein a control program to be executed by the central processing unit 117, and the second memory 131B stores therein the transaction information received from the non-contact IC card 101, and other various data. The control program stored in the first memory 113A causes the central processing unit 117 to transform transaction information received from the non-contact IC card 101, into an e-mail, and to transmit the thus transformed e-mail to a predetermined address through the base station 300.

Figure 4:
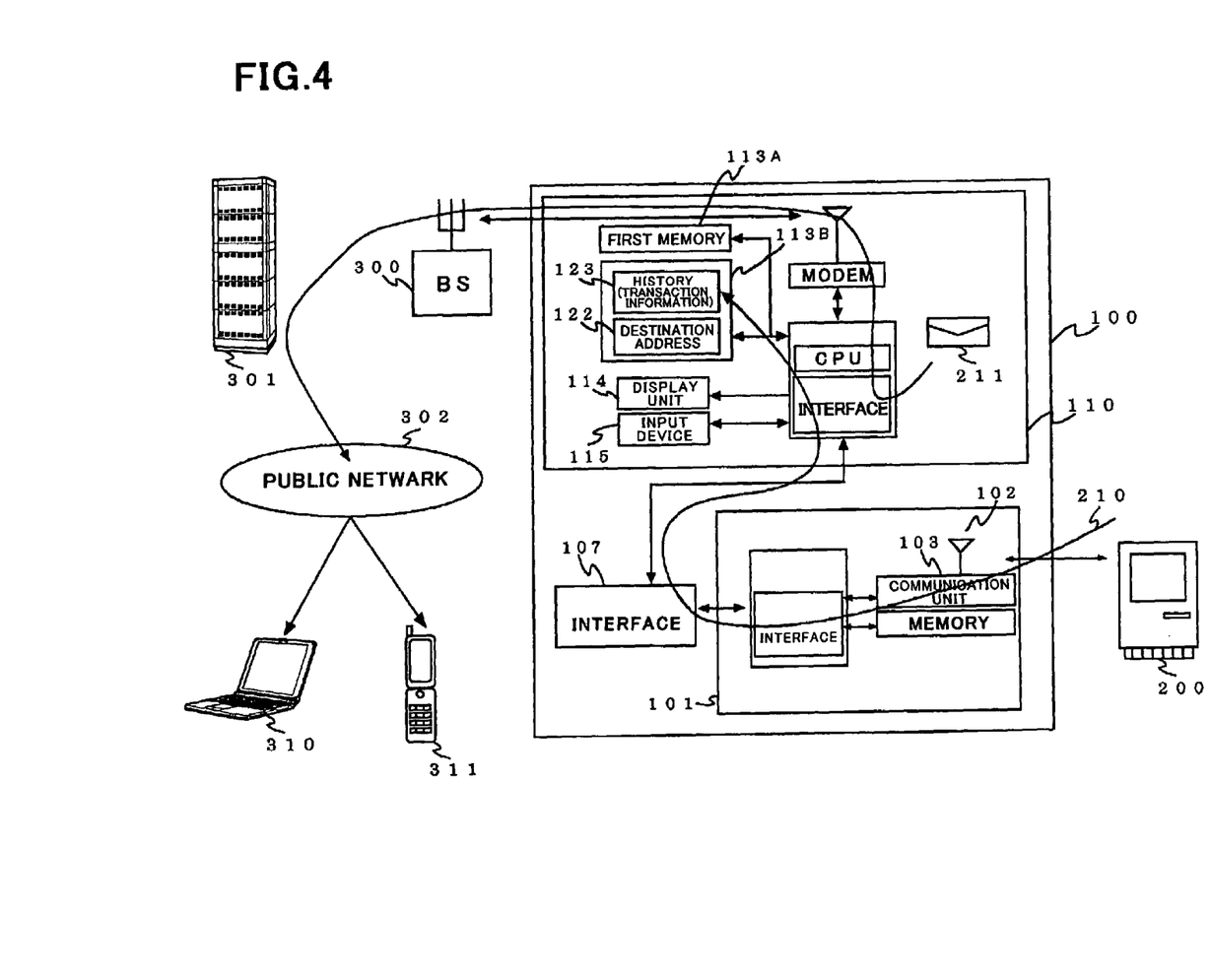
FIG. 4 is a block diagram showing a signal flow in the mobile communication terminal illustrated in FIG. 3.

FIG. 4 is a block diagram showing a signal flow in the cellular phone 100. Hereinbelow is explained, with reference to FIG. 4, an operation to be carried out by the cellular phone 100 when an electronic settlement is made.

First, a user inputs an e-mail address of a terminal to which an e-mail transformed from transaction information is transmitted, through the input device 115. A user may select an other's personal computer 310 or other's cellular phone 311 to which an e-mail transformed from transaction information is to be transmitted. The e-mail address determined by a user is stored in the second memory 113B as a destination address 122.

It is necessary for a user to be authenticated as to whether he/she is really an owner of the cellular phone 100 for changing the thus determined destination address 122 to a new address. In the present embodiment, a user has to input a predetermined password to the central processing unit 117 through the input device 115. The central processing unit 117 compares a password having been input by a user to a predetermined password stored in the second memory 113B. If they are identical with each other, the central processing unit 117 allows a user to input a new address. If they are not identical with each other, the central processing unit 117 requests a user to input a password again, until a predetermined password is input by a user.

In the present embodiment, since the destination address 122 is stored in the second memory 113B, an e-mail transformed from transaction information is transmitted to the destination address 122, even if the non-contact IC card 101 is replaced with a new one.

The communication unit 103 in the non-contact IC card 101 is designed to be able to make radio-signal communication with the IC-card reader/writer 200 through the antenna 102. The IC-card reader/writer 200 makes access with an IC-card system (not illustrated) through a network, and judges whether a non-contact IC card making communication therewith is really the non-contact IC card 101 in the cellular phone 100. If the IC-card reader/writer 200 judges a non-contact IC card making communication therewith is really the non-contact IC card 101, the IC-card reader/writer 200 charges the non-contact IC card 101 of a fee for a user's purchase.

When the IC-card reader/writer 200 makes electronic settlement, the IC-card reader/writer 200 transmits transaction information 210 to the non-contact IC card 101. The transaction information 210 includes a fee, an address of a shop at which a user purchased something, date and time at which a user purchased something, and what a user purchased.

On receipt of the transaction information from the IC-card reader/writer 200, the non-contact IC card 101 transmits the transaction information 210 to the phone unit 110 through the interface 107.

On receipt of the transaction information 210 from the non-contact IC card 101, the central processing unit 117 stores the received transaction information 210 in the second memory 113B as a history 123 of how the non-contact IC card 101 has been used, that is, a history of user's purchases, and causes the display unit 114 to display the received transaction information 210.

Then, the central processing unit 117 transforms the transaction information 210 into an e-mail 211. Then, the central processing unit 117 transmits the thus transformed e-mail 211 to the destination address 122 stored in the second memory 113B. The e-mail 211 is transmitted to the destination address 122 such as the personal computer 310 or the cellular phone 311 from the cellular phone 100 through the base station 300, a server 301 and a public network 302.

As mentioned above, the cellular phone 100 in accordance with the embodiment receives the transaction information 210 from the IC-card reader/writer 200 through the non-contact IC card 101, transforms the received transaction information 210 into an e-mail 211, and transmits the e-mail 211 to the destination address 122 stored in the second memory 113B.

Figure 5:
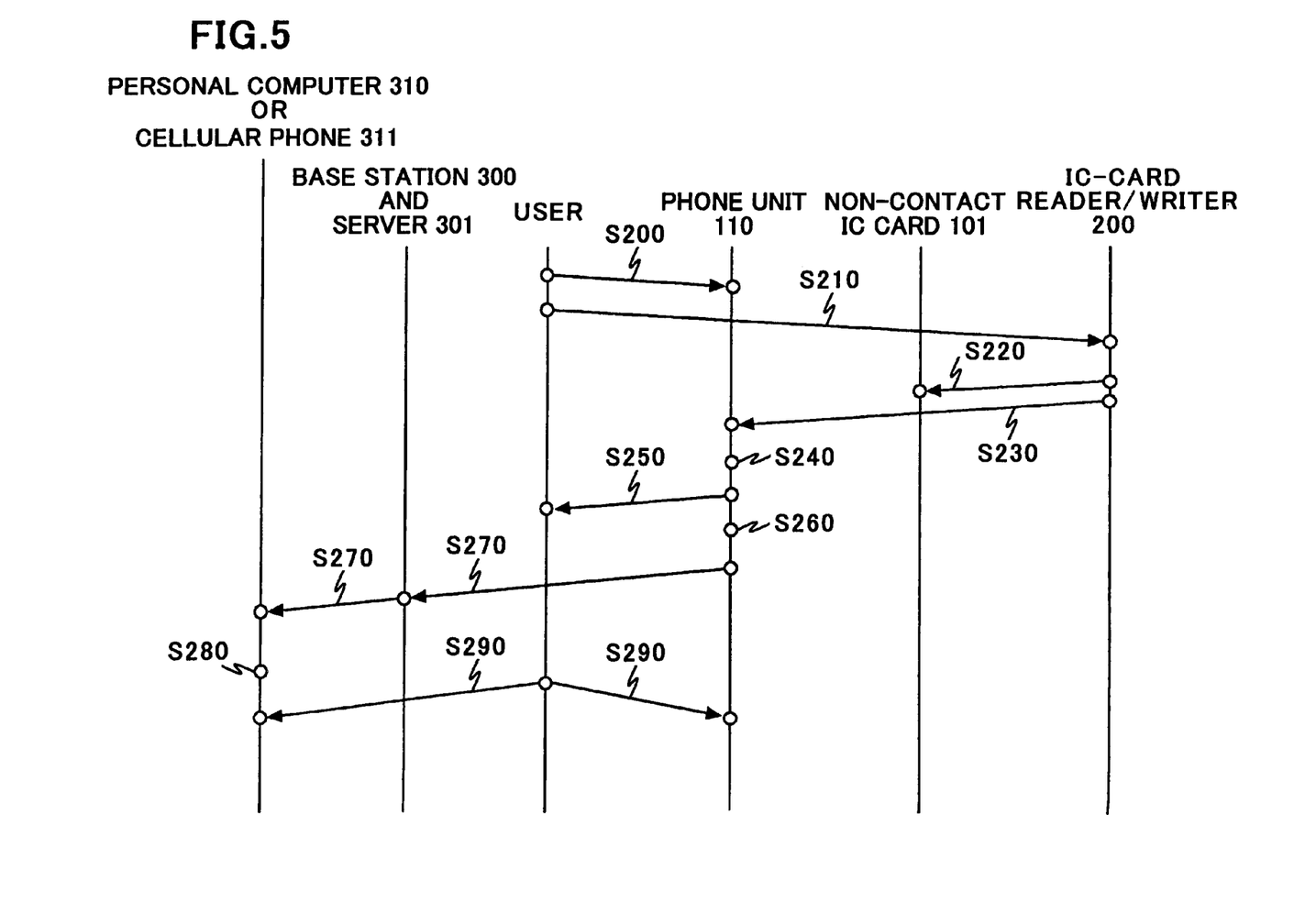
FIG. 5 is a flow-chart showing steps to be carried out when a user purchases something through electronic money through the mobile communication terminal illustrated in FIG. 3.

FIG. 5 is a flow-chart showing steps to be carried out when a user purchases something through electronic money through the cellular phone 100 in accordance with the embodiment.

First, a user inputs his/her desired address into the cellular phone 100 through the input device 115 (step S200). The central processing unit 117 stores the address into the second memory 113B as the destination address 122.

When a user of the cellular phone 100 purchases something through electronic money, the IC-card reader/writer 200 reads data out of the non-contact IC card 101 for identifying the user (step S210).

The IC-card reader/writer 200 charges the non-contact IC card 101 of a fee (step S220), and concurrently, transmits the transaction information 210 to the phone unit 110 through the non-contact IC card 101 (step S230).

On receipt of the transaction information 210, the central processing unit 117 in the phone unit 110 stores the received transaction information 210 in the second memory 113B (step S240). Then, the central processing unit 117 causes the display unit 114 to display the received transaction information 210 stored in the second memory 113B (step S250).

Then, the central processing unit 117 transforms the transaction information 210 into an e-mail 211 (step S260).

Then, the central processing unit 117 transmits the thus transformed e-mail 211 to the destination address 122 stored in the second memory 113B. The e-mail 211 is transmitted to the destination address 122 such as the personal computer 310 or the cellular phone 311 from the cellular phone 100 through the base station 300, the server 301 and the public network 302 (step S270).

On receipt of the e-mail 211, the personal computer 310 or the cellular phone 311 stores the e-mail 211 indicative of the transaction information 210, in a memory thereof (step S280).

The user can view the transaction information 210 displayed in a display screen of the display unit 114 of the cellular phone 110 or in a display screen of a display unit of the personal computer 310 or the cellular phone 311 which the user designated as the destination address 122 (step S290).

The cellular phone 100 in accordance with the above-mentioned embodiment provides advantages as follows.

A history of transaction information, that is, how a non-contact IC card has been used is stored in a limited storage area in a memory in a conventional cellular phone. Hence, older transaction information is deleted when newer transaction information is stored. In contrast, the cellular phone 100 transmits old transaction information to other terminals such as the personal computer 310 or the cellular phone 311. Since a memory of the personal computer 310 and/or the cellular phone 311 can be considered as an external memory of the cellular phone 100, the non-contact IC card 101*l* may be designed to have a small capacity.

Considering that the transfer of the transaction information 210 to a memory in the personal computer 310 and/or the cellular phone 311 is equivalent to back-up of the transaction information 210, all of the transaction information 210 is automatically copied in a memory of the personal computer 310 and/or the cellular phone 311 without acknowledgment of a user. Hence, even if a user lost the cellular phone 100 or the cellular phone 100 became out of order, a user can keep back-up data of the transaction information 210.

The destination address 122 can be varied, only when a person who tries to change an address is judged to be really a user of the cellular phone 100. Hence, even if the cellular phone 100 is lost or thieved, and the non-contact IC card 101 is illegally used, the transaction information 210 is transmitted to the destination address 122. Hence, the transaction information 210 can be used for identifying a place in which the non-contact IC card 101 has been used.

Furthermore, when the non-contact IC card 101 is used, the e-mail 211 indicative of the transaction information 210 is concurrently transmitted to the destination address 122. Since the transaction information 210 includes data indicative of a place at which the non-contact IC card 101 has been used, it would be possible to detect a place at which the non-contact IC card 101 has been used, without use of GPS.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2003-100062 filed on Apr. 3, 2003 including specification, claims, drawings and summary is incorporated herein by reference in its entirety.

What is claimed is:

1. A mobile communication terminal comprising a non-contact IC card into which an external IC-card reader/writer can read or write transaction information from or to, wherein said mobile communication terminal, when transaction information is written to a memory of said non-contact IC card, also includes said transaction information in a communication message, and transmits said communication message to a predetermined address.

2. The mobile communication terminal as set forth in claim 1, wherein said predetermined address is modified by a user by inputting an input address into said mobile communication terminal.

3. The mobile communication terminal as set forth in claim 2, wherein said predetermined address modified after an authentication of said.

4. The mobile communication terminal as set forth in claim 3, wherein said authentication of said user takes place when said user inputs into said mobile communication terminal an authentication password which is identical to a predetermined password.

5. The mobile communication terminal as set forth in claim 1, wherein said mobile communication terminal is a cellular phone.

6. The mobile communication terminal as set forth in claim 1, wherein said non-contact IC card comprises an antenna, a communication unit for communicating with said external IC card reader/writer through said antenna, said memory, and a controller for controlling data sent between said communication unit and said memory.

7. The mobile communication terminal as set forth in claim 6, wherein said data is transaction information.

8. The mobile communication terminal as set forth in claim 1, wherein said communication message is an electric mail message.

9. A method of transferring transaction information in a mobile communication terminal including a non-contact IC card into which an external IC-card reader/writer can write transaction information, comprising:

(a) when transaction information is written to a memory of said non-contact IC cards, including said transaction information in a communication message; and (b) transmitting said communication message to a predetermined address.

10. The method as set forth in claim 9, further comprising modifying said predetermined address by inputting an input address into said mobile communication terminal.

11. The method as set forth in claim 10, further comprising authenticating a user of said mobile communication terminal when said user inputs said input address, before said predetermined address is modified.

12. The mobile communication terminal as set forth in claim 9, wherein said non-contact IC card comprises an antenna, a communication unit for communicating with said external IC card reader/writer through said antenna, said memory, and a controller for controlling data sent between said communication unit and said memory.

13. The mobile communication terminal as set forth in claim 9, wherein said communication message is an electric mail message.

14. A program for causing a computer to carry out a method of transferring transaction information in a mobile communication terminal including a non-contact IC card into which an external IC-card reader/writer can write transaction information, steps executed by said computer in accordance with said program comprising:

(a) when transaction information is written to a memory of said non-contact IC card, including said transaction information in a communication message; and (b) transmitting said communication message to a predetermined address.

15. The program as set forth in claim 14, wherein said steps further include modifying said predetermined address when a user of said mobile communication terminal inputs an input address into said mobile communication terminal.

16. The program as set forth in claim 15, wherein said steps further include authenticating a user at said mobile communication terminal when said user inputs said input address, before said predetermined address is modified.

17. The mobile communication terminal as set forth in claim 14, wherein said non-contact IC card comprises an antenna, a communication unit for communicating with said external IC card reader/writer through said antenna, said memory, and a controller for controlling data sent between said communication unit and said memory.

18. The mobile communication terminal as set forth in claim 14, wherein said communication message is an electric mail message.

* * * * *